L. BRADLEY.
ELECTRIC CURRENT CONTROLLER.
APPLICATION FILED JULY 29, 1916.
1,317,774.
Patented Oct. 7, 1919.
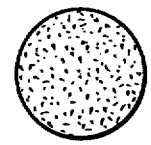
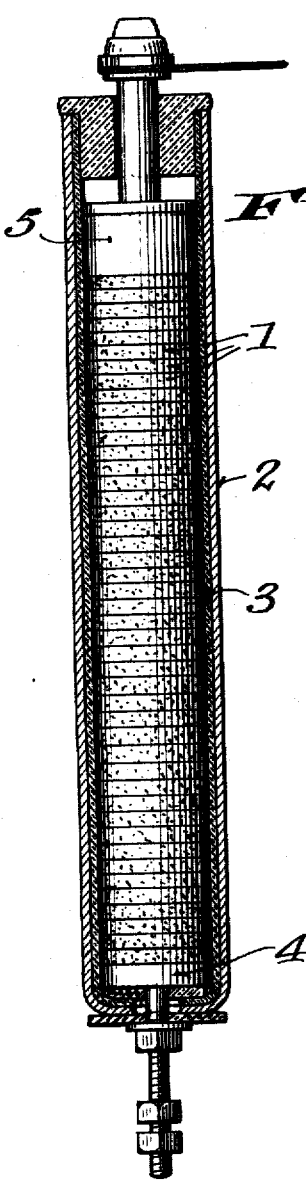
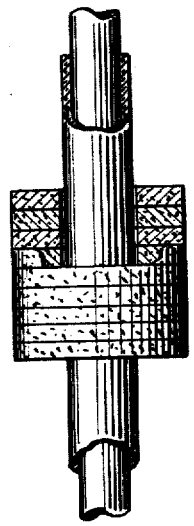
Inventor
Lynde Bradley
By Louis Quarles
Attorney

UNITED STATES PATENT OFFICE.

LYNDE BRADLEY, OF MILWAUKEE, WISCONSIN.

ELECTRIC-CURRENT CONTROLLER.

1,317,774.  Specification of Letters Patent.  Patented Oct. 7, 1919.

Application filed July 29, 1916. Serial No. 112,009.

*To all whom it may concern:*

Be it known that I, LYNDE BRADLEY, a citizen of the United States, residing at Milwaukee, in the county of Milwaukee and State of Wisconsin, have invented certain new and useful Improvements in Electric-Current Controllers, of which the following is a specification.

My invention relates to improvements in electric-current controlling devices, with especial reference to that class of controlling devices disclosed in my former Patents Numbers 723,817, dated March 31, 1903; 815,317, dated March 13, 1906, and 1,161,021, dated November 23, 1915. The general object of such devices is to vary the protecting resistance in circuit with the motor or other electrically operated apparatus and to commutate the circuits connected therewith.

The object of the invention herein fully explained is to provide a resistance material of amorphous carbon less subject to disintegration from use than has heretofore been the property of amorphous carbon resistors.

It is a further object of the invention to provide a carbonaceous resistance material possessing relatively high contact resistance and that will remain constant through long continued use and will not have its resistance at normal temperatures permanently altered by excessive heating or pressure or both.

Carbon resistors intended for controlling the flow of currents for use with motors or other electrical machines or apparatus have heretofore been made by mixing or pugging finely powdered petroleum coke, gas retort carbon, lamp black or graphite with some liquid carbonizable binder such as caramel, molasses or coal tar. This mixture was then molded under pressure into the shapes desired or squirted into the form of rods, tubes, or plates by means of a suitable press. The molded or squirted pieces were then baked dry and then fired at a high temperature for the purpose of carbonizing the binder.

After carbonization, such an article of course contains carbon from two sources, from the coke or the like and from the binder; and these two kinds of carbon are never of the same mechanical or physical and electrical properties. The particles are not homogeneous in the sense that all the carbon they contain is of the same origin.

Carbon made in the manner described when used as a resistance element in connection with electric current controllers of the class previously referred to, or when used as a resistance element in electric heating devices, has proved unsatisfactory, due to its property of disintegration or returning to powdered form when repeatedly heated and cooled. I am not certain as to the exact cause of this phenomenon though I attribute it to the difference of co-efficient of expansion between the particles of finely ground carbon and the carbon formed by carbonizing the binder, or possibly a crystallization or graphitization resulting in internal stress and cleavage or parting planes. and also to the stresses set up between the original carbon particles and the carbonized binder due to shrinkage when carbonized, which results in finally forcing the binder carbon to release its hold or break apart from the original carbon powder. There is also a certain amount of ash and other incombustible, non-volatile, non-conductors which are often present in considerable amounts in carbon resistors as heretofore made. This results in cases of overheating in the formation of films of non-conductors gradually forming at the points of contact of the resistor elements which tend to increase the resistance thereof and eventually cause the resistor elements to disintegrate, due to the arcing.

This deterioration of the resistor element composed of non-homogeneous amorphous carbon results in making the controlling devices with which they are associated of comparatively short life, resulting in their becoming quickly inoperative and under some circumstances dangerous.

With my improved method of making carbon resistors, the material carbonized is a homogeneous solid and no binder is necessary. The resulting carbon is of the amorphous variety and of uniform texture; it possesses a relatively high contact resistance which is readily varied by and will stand a large amount of pressure; and it will not deteriorate due to variations in temperature below its ignition point or below what I call its critical point being about 400° C. at which point ordinary carbon commences to oxidize rapidly.

I am aware that considerable work has been done in the making of carbon for use in incandescent lamps, telephone transmitters, and microphones, but the problems to be solved in those arts are quite different from those in the art of electric current controllers that are called upon to handle heavy currents, stand intense and varying degrees of heat, together with the disturbing effects of great pressure and shock, and in addition the oxidation consequent upon exposure to the atmosphere when in a heated condition. Because of these and other differences the results arrived at in those fields have not produced a carbon resistor element that will operate successfully in an electric current controller of the class described. It is very important in a resistor element that the completed resistor element be entirely free from ash or other non-volatile, foreign matters, as their presence results in an element which will gradually break down when subjected to varying degrees of pressure, heat, and air, and the carbon resistor disintegrates or powders up and becomes useless.

To accomplish my invention I first form the material to be carbonized in the shape desired, which may be in the exact form which the carbonized article is to assume, with the proper allowance made for shrinkage, or the material may be made into such shape that when it is carbonized it can be readily cut into the form desired. It is very important that the substance from which the carbon is to be made is high in carbon content, free from ash producing elements, and is entirely homogeneous, so that the resulting product may maintain a high degree of homogeneity. It is also important that the resultant product be sufficiently hard and dense to have the necessary mechanical strength to withstand the pressures to which it must be subjected and the carbon must be uniformly refractory so as to be unaltered by thermal changes. I find such carbonaceous substances as viscose, a cellulose product made from a solution of soda cellulose and carbon disulfid, when carbonized, will produce a carbon possessing the characteristics desired. I also find that synthetic resins generally, including phenol aldehyde resins, such as a material sold under the name of bakelite and made by the addition of a base to a mixture of phenol and formaldehyde can be formed into the shapes desired and when carbonized produces a satisfactory resistance material. A substance made by denitrating the well known material celluloid a nitrocellulose product will also, when carbonized, result in a carbon product which possesses the necessary characteristics to successfully meet the requirements of a resistance material. This denitrating of the celluloid is accomplished by treating it with ammonium sulfid.

The use of viscose and denitrated nitrocellulose in so far as they are separable from my generic invention are not claimed herein specifically, but I content myself with the generic claims.

The raw material that I desire to use may be carbonized by heating it slowly in a retort filled with powdered graphite or other reducing agent so that the hydrogen and oxygen content in the raw material may be driven or distilled off without any loss of carbon due to the oxidation thereof. This is important as any material loss of carbon means either shrinkage in size or a spongy texture or both, characteristics which are undesirable for my purpose. It is desirable that the carbonized product have the original shaped face of the molded plastic.

I do not wish to restrict myself to the specific materials mentioned for the purpose of forming carbonaceous resistors as there are other homogeneous substances that have a sufficient carbon content in their molecular structure to enable them to be used for a similar purpose, among them coal tar residue.

An illustrative embodiment of the invention is shown in the accompanying drawings, wherein—

Figure 1 shows a resistor unit in the form of a rod provided with suitable terminals at each end.

Fig. 2 represents a resistor element in the form of a disk.

Fig. 3 is a sectional view of an assembled resistance unit of the form in which a column or pack of homogeneous amorphous carbon disks or plates are employed as the resistance elements. The effective resistance is the resistance of contact at the joints between each of the plates comprising the pack or column and is varied by increasing or decreasing the pressure on the column, thus bringing the numerous joints into more or less intimate contact. The particular mechanism for compressing the resistor pack forms no part of the present invention, a suitable mechanism for the purpose being shown, for instance, in Patent No. 823,697, dated May 29, 1916, for electric current controller. A method of and a means for exerting and relieving the pressure on a column of disks is clearly indicated in that patent. Since my present invention relates to the variable resistance element rather than to any special means of varying the pressure thereon, it is obvious that the assembled variable resistance unit embodying my present invention may be made in any form and may be used with any type of compressing means. In Fig. 3 a stack of resistor disks or plates 1, as indicated in Fig. 2, are shown within a container 2, which is a metal tube suitably lined with heat resisting electrical insulating material 3, having a fixed contact 4 and a slidable contact 5.

Fig. 4 is a part of a modified form of the resistor element as described, parts being broken away, and is arranged to be supported by a rod passing through the center.

Having fully described my invention, I claim:

1. In an electric controller adapted for handling heavy electric currents and provided with means for applying variable pressure to a resistance element, a resistance element composed of a mass of amorphous carbon of unitary origin and of substantial homogeneity.

2. In an electric controller adapted for handling heavy electric currents and provided with means for applying variable pressure to a resistance element, a resistance element composed of a carbonized shaped body of plastic material, such carbonized body being free of materials other than carbon and substantially homogeneous.

3. In an electric controller adapted for handling heavy electric currents and provided with means for applying variable pressure to a resistance element, a resistance element composed of a plurality of assembled flat disks lying face to face and each composed of a mass of amorphous carbon of unitary origin and substantial homogeneity.

4. In an electric controller adapted for handling heavy electric currents and provided with means for applying variable pressure to a resistance element, a resistance element composed of a plurality of assembled flat disks lying face to face and each composed of a carbonized shaped body of plastic material, such carbonized body being free of materials other than carbon and substantially homogeneous.

5. In an electric controller adapted for handling heavy electric currents and provided with means for applying variable pressure to a resistance element, a resistance element composed of a mass of amorphous carbon of unitary origin and substantial homogeneity, said mass being substantially free of ash.

6. As a new article for use as a resistance element for controllers handling heavy electric currents, a flat faced disk of carbonized homogeneous plastic material, said face representing an original molded face of said plastic material.

7. An electric current controller containing a resistance element comprising conductive carbonized synthetic resin.

8. An electric current controller containing a resistance element comprising conductive carbonized synthetic resin of a high carbon content.

9. An electric current controller containing a resistance element comprising conductive carbonized phenol aldehyde resin.

LYNDE BRADLEY.

Witnesses:
G. S. SALENTINE,
LOUIS QUARLES.